United States Patent
Tsunemasu et al.

(10) Patent No.: US 11,512,754 B2
(45) Date of Patent: Nov. 29, 2022

(54) PHENOL RESIN FOR WET FRICTION MATERIAL, PHENOL RESIN COMPOSITION, AND WET FRICTION MATERIAL

(71) Applicants: NSK-WARNER K.K., Tokyo (JP); SUMITOMO BAKELITE CO., LTD., Tokyo (JP)

(72) Inventors: Takuya Tsunemasu, Fukuroi (JP); Takao Kunimi, Tokyo (JP)

(73) Assignees: NSK-Warner K.K., Tokyo (JP); SUMITOMO BAKELITE CO., LTD., Tokyo (JP)

( * ) Notice: Subject to any disclaimer, the term of this patent is extended or adjusted under 35 U.S.C. 154(b) by 322 days.

(21) Appl. No.: 16/801,387

(22) Filed: Feb. 26, 2020

(65) Prior Publication Data

US 2020/0271177 A1    Aug. 27, 2020

(30) Foreign Application Priority Data

Feb. 27, 2019  (JP) .............................. JP2019-034574

(51) Int. Cl.
*C08G 8/24*    (2006.01)
*F16D 69/02*   (2006.01)
*F16D 13/60*   (2006.01)

(52) U.S. Cl.
CPC ............. *F16D 69/026* (2013.01); *C08G 8/24* (2013.01); *F16D 13/60* (2013.01); *F16D 2200/006* (2013.01); *F16D 2200/0056* (2013.01); *F16D 2200/0091* (2013.01)

(58) Field of Classification Search
CPC ........... F16D 69/026; F16D 2200/0091; F16D 2200/0056; F16D 2200/006; F16D 13/60; C08G 8/24
See application file for complete search history.

(56) References Cited

U.S. PATENT DOCUMENTS

| 4,026,867 | A  | * | 5/1977  | Gardiner | ................... | C08G 8/18 |
| | | | | | | 528/148 |
| 2013/0288003 | A1 | * | 10/2013 | Foege | ................... | F16D 69/026 |
| | | | | | | 428/141 |
| 2018/0079938 | A1 | * | 3/2018  | Mifuka | .................. | C09J 163/00 |
| 2020/0094537 | A1 | * | 3/2020  | Wu | ......................... | B32B 27/40 |

FOREIGN PATENT DOCUMENTS

| JP | 7-207121 A     |   | 8/1995 |
| JP | 2000063465 A   | * | 2/2000 |
| JP | 2003292727 A   | * | 10/2003 |
| JP | 2015-147885 A  |   | 8/2015 |
| JP | 2019038945 A   | * | 3/2019 |

* cited by examiner

*Primary Examiner* — Vishal R Sahni
(74) *Attorney, Agent, or Firm* — WHDA, LLP

(57) ABSTRACT

A phenol resin for a wet friction material of the invention contains a resol-type phenol resin having, in one molecule, a structural unit A which is derived from a phenol compound having one phenolic hydroxyl group and a structural unit B which is derived from a polyfunctional phenol compound having two phenolic hydroxyl groups.

8 Claims, No Drawings

PHENOL RESIN FOR WET FRICTION MATERIAL, PHENOL RESIN COMPOSITION, AND WET FRICTION MATERIAL

This application is based on Japanese patent application No. 2019-034574 filed on Feb. 27, 2019, the content of which is incorporated hereinto by reference.

BACKGROUND

Technical Field

The invention relates to a phenol resin for a wet friction material, a phenol resin composition, and a wet friction material.

Related Art

Conventionally, as a binder of wet friction materials used in a clutch brake for an automatic transmission of automobiles, a resol-type phenol resin has been investigated in various ways. As a technique relating to this type of resin, for example, the technique described in Japanese Laid-open patent publication NO. 07-207121 is known.

Japanese Laid-open patent publication NO. 07-207121 describes that in a case where a maleimide-modified phenol resin obtained by modifying a resol-type phenol resin with a maleimide compound is applied to a wet friction material as a binder of a substrate, the wet friction material exhibits stable friction characteristics. However, in Japanese Laid-open patent publication NO. 07-207121, there is no statement of physical durability (Japanese Laid-open patent publication NO. 07-207121, claim 1).

SUMMARY

As a result of conducting investigations, the inventor of the invention has revealed that the durability of the resol-type phenol resin can be further improved by inhibiting the change in the total thickness of the resin.

As described in paragraph 0019 in Japanese Laid-open patent publication NO. 07-207121, the maleimide-modified phenol resin described in the same document is obtained by modifying a resol-type phenol resin with a maleimide compound by paying attention to heat resistance which is a characteristic of maleimide compound-based resins.

The inventor of the invention has found that in a case where a benzene ring skeleton (that is, a phenol skeleton) having a phenolic hydroxyl group is appropriately selected in the molecular structure of the resol-type phenol resin, even though a resin skeleton other than the resol-type phenol resin is not used, it is possible to control the durability of the wet friction material using such a resol-type phenol resin.

Based on the finding, the inventor further conducted intensive investigations. As a result, the inventor has found that in a case where a structural unit A derived from a phenol compound having one phenolic hydroxyl group and a structural unit B derived from a polyfunctional phenol compound having two phenolic hydroxyl groups are used in combination, the durability of the wet friction material using the resol-type phenol resin is improved. In this way, the inventor has accomplished the invention.

In one embodiment, there is provided a phenol resin for a wet friction material, containing a resol-type phenol resin having, in one molecule, a structural unit A which is derived from a phenol compound having one phenolic hydroxyl group represented by the following General Formula (A) and a structural unit B which is derived from a polyfunctional phenol compound having two phenolic hydroxyl groups represented by the following General Formula (B).

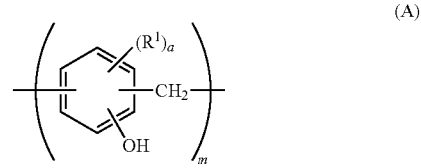

(In General Formula (A), $R^1$ each independently represents a substituent other than a hydroxyl group, a represents an integer of 0 to 3, and m represents an integer equal to or greater than 1 and equal to or smaller than 10.)

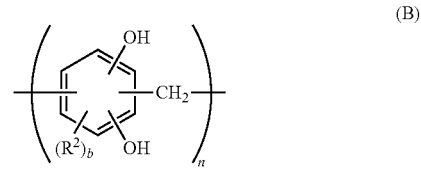

(In General Formula (B), $R^2$ each independently represents a substituent other than a hydroxyl group, b represents an integer of 0 to 2, and n represents an integer equal to or greater than 1 and equal to or smaller than 10.)

In another embodiment, there is provided a phenol resin composition containing the phenol resin for a wet friction material and an organic solvent.

In another embodiment, there is provided a wet friction material obtained by impregnating a substrate with the phenol resin composition.

According to the invention, there are provided a phenol resin for a wet friction material having excellent durability and a phenol resin composition and a wet friction material which use the phenol resin.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

The phenol resin for a wet friction material of the present embodiment will be schematically described.

The phenol resin for a wet friction material of the present embodiment contains a resol-type phenol resin having, as structures contained in one molecule, a structural unit A which is derived from a phenol compound having one phenolic hydroxyl group represented by the following General Formula (A) and a structural unit B derived from a polyfunctional phenol compound having two phenolic hydroxyl groups represented by the following General Formula (B).

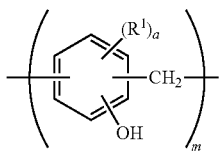

(In General Formula (A), $R^1$ each independently represents a substituent other than a hydroxyl group, a represents an integer of 0 to 3, and m represents an integer equal to or greater than 1 and equal to or smaller than 10.)

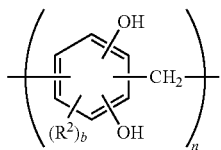

(In General Formula (B), $R^2$ each independently represents a substituent other than a hydroxyl group, b represents an integer of 0 to 2, and n represents an integer equal to or greater than 1 and equal to or smaller than 10.)

The inventor of the invention has found that in a case where a phenol skeleton is appropriately selected in the molecular structure of a resol-type phenol resin, and the structural unit A derived from a phenol compound having one phenolic hydroxyl group and the structural unit B derived from a polyfunctional phenol compound having two phenolic hydroxyl groups are used in combination, the durability of a wet friction material using the resol-type phenol resin is improved.

The mechanism that brings about the above effect is unclear. However, presumably, in a case where a molecular structure, in which the structural unit A derived from a phenol compound having one phenolic hydroxyl group and the structural unit B derived from a polyfunctional phenol compound having two phenolic hydroxyl groups are used in combination, is appropriately selected, the adhesiveness of the resol-type resin with respect to a substrate may be improved, and accordingly, the durability of the wet friction material may be improved.

The wet friction material of the present embodiment is obtained by impregnating a substrate with a phenol resin composition (resin varnish) containing the phenol resin for a wet friction material and an organic solvent. In such a wet friction material, excellent durability can be realized.

The wet friction material is a friction material (clutch friction material) used in an automatic transmission of automatic cars and the like. In the wet friction material, generally, a resol-type phenol resin is used.

In recent years, due to the energy and environmental problems, low energy consumption has been pursued, and accordingly, the size and weight of the automatic transmission have been reduced. Consequently, for the wet friction material, the reduction in diameter and the decrease in the number of sheets of the wet friction material are required. The conventional wet friction material that meets the requirements lacks torque capacity. Therefore, in order to compensate for the lack of torque capacity, the characteristics required for the phenol resin for a wet friction material are increasing every year. In this regard, in a case where the phenol resin for a wet friction material of the present embodiment is used, a wet friction material having excellent durability can be realized. Accordingly, the phenol resin for a wet friction material of the present embodiment is expected to contribute to the downsizing of the wet friction material.

Hereinafter, the phenol resin for a wet friction material of the present embodiment will be specifically described.

The phenol resin for a wet friction material of the present embodiment contains a resol-type phenol resin having, in one molecule, the structural unit A derived from a phenol compound having one phenolic hydroxyl group and the structural unit B derived from a polyfunctional phenol compound having two phenolic hydroxyl groups.

The method for manufacturing the resol-type phenol resin is not particularly limited. A phenol compound A having one phenolic hydroxyl group and a polyfunctional phenol compound B having two phenolic hydroxyl groups may be allowed to react with aldehydes. Alternatively, the phenol compound A having one phenolic hydroxyl group may be allowed to react with aldehydes, and then the obtained reaction compound may be allowed to react with the polyfunctional phenol compound B having two phenolic hydroxyl groups. From the viewpoint of manufacturing the resol-type phenol resin, the above reactions can be performed under alkaline conditions or slightly acidic conditions. Under the alkaline conditions, an alkaline catalyst can be used. Under the slightly acidic conditions, a zinc-based catalyst can be used.

The phenol compound A having one phenolic hydroxyl group is not particularly limited as long as the compound has a benzene ring having one phenolic hydroxyl group. In a molecule of the phenol compound A, the benzene ring having a phenolic hydroxyl group may have one kind of substituent or two or more kinds of substituents other than the hydroxyl group. As the phenol compound A, a monomer compound can be used.

As the substituent in the phenol compound A, for example, an alkyl group, an aryl group, a vinyl group, a halogen element, an amino group, and a nitro group may be each independently used, or a group obtained by combining these may be used. Among these, an unreactive substituent is preferable, and a hydrocarbon group such as an alkyl group or an aryl group is more preferable. The aryl group as a substituent may constitute a condensed ring by being condensed with the benzene ring described above.

One of the examples of the phenol compound A having one phenolic hydroxyl group is not particularly limited, and includes phenol; cresol such as o-cresol, m-cresol, and p-cresol; xylenol such as 2,3-xylenol, 2,4-xylenol, 2,5-xylenol, 2,6-xylenol, and 3,5-xylenol; alkylphenol such as 2,3,5-trimethylphenol, 2-ethylphenol, 4-ethylphenol, 2-isopropylphenol, 4-isopropylphenol, n-butylphenol, isobutylphenol, tert-butylphenol, hexylphenol, octylphenol, nonylphenol, phenylphenol, benzylphenol, cumylphenol, allylphenol, and cardanol; naphthol such as 1-naphthol and 2-naphthol; halogenated phenol such as fluorophenol, chlorophenol, bromophenol, and iodophenol, substituted monovalent phenol such as p-phenylphenol, aminophenol, nitrophenol, dinitrophenol, and trinitrophenol; bisphenol such as bisphenol S, bisphenol F, bisphenol A, bisphenol C, bisphenol Z, and bisphenol E, and the like. One kind of each of these may be used singly, or two or more kinds of these may be used in combination.

The phenol compound A can contain one or more kinds of compounds selected from the group consisting of phenol, cresol, xylenol, alkylphenol, and bisphenol among the above compounds. From the viewpoint of inexpensiveness, phenol, cresol, cardanol, butylphenol, and bisphenol A can be used, and phenol, cresol, and cardanol can be particularly preferably used.

The polyfunctional phenol compound B having two phenolic hydroxyl groups is not particularly limited as long as the compound has a benzene ring having two phenolic hydroxyl groups. In a molecule of the polyfunctional phenol compound B, the benzene ring having two phenolic hydroxyl groups may have one kind of substituent or two or more kinds of substituents other than the hydroxyl groups. As the polyfunctional phenol compound B, a monomer compound can be used.

As the substituent in the polyfunctional phenol compound B, for example, an alkyl group, an aryl group, a vinyl group, a halogen element, an amino group, and a nitro group can be each independently used, or a group obtained by combining these can be used. Among these, an unreactive substituent is preferable, and a hydrocarbon group such as an alkyl group or an aryl group is more preferable. The aryl group as a substituent may constitute a condensed ring by being condensed with the benzene ring described above.

One of the examples of the polyfunctional phenol compound B having two phenolic hydroxyl groups is not particularly limited, and includes resorcinol, alkyl resorcinol, catechol, alkyl catechol, hydroquinone, alkyl hydroquinone, dihydroxynaphthalene, and the like. From the viewpoint of inexpensiveness, it is preferable that the polyfunctional phenol compound B contains one or more kinds of compounds selected from the group consisting of resorcinol, catechol, and hydroquinone among the above compounds.

In the method for manufacturing the phenol resin for a wet friction material, another phenol compound different from the phenol compound A and the polyfunctional phenol compound B may be additionally used. Another phenol compound described above may be any of a mononuclear compound having one phenol ring, a dinuclear compound having two phenol rings, or a trinuclear compound having three phenol rings, and may have one phenolic hydroxyl group or two or more phenolic hydroxyl groups.

Phenols in the manufacturing method described above contain the phenol compound A and the polyfunctional phenol compound B and contain another phenol compound if necessary.

The aldehydes described above are not particularly limited, and examples thereof include formaldehyde such as formalin and p-formaldehyde; trioxane, acetaldehyde, p-aldehyde, propionaldehyde, polyoxymethylene, chloral, hexamethylenetetramine, furfural, glyoxal, n-butyraldehyde, isobutyraldehyde, tert-butyraldehyde, caproaldehyde, allyl aldehyde, benzaldehyde, crotonaldehyde, acrolein, tetraoxymethylene, phenylacetaldehyde, o-tolualdehyde, salicylaldehyde, and the like. One kind of each of these aldehydes may be used singly, or two or more kinds of these aldehydes may be used in combination. The aldehydes can contain formaldehyde or acetaldehyde among the above compounds. From the viewpoint of productivity and inexpensiveness, formalin or p-formaldehyde can be used.

In a step of obtaining the reaction solution described above, it is possible to allow the phenols and the aldehydes described above to have a reaction under alkaline conditions, for example, with a pH equal to or higher than 7 by using an alkaline catalyst.

The alkaline catalyst is not particularly limited. For example, it is possible to use alkaline substances including an oxide, a hydroxide, and a carbonate of alkali metals such as sodium hydroxide, lithium hydroxide, potassium hydroxide, and sodium carbonate, aqueous ammonia, amines such as monomethylamine, dimethylamine, trimethylamine, monoethylamine, diethylamine, methylethylamine, triethylamine, and hexamethylenetetramine, and an oxide and a hydroxide of alkali earth metals such as calcium, magnesium, and barium. One kind of each of these compounds may be used singly, or two or more kinds of these compounds may be used in combination. For example, sodium hydroxide may be used.

In a step of obtaining the reaction solution described above, it is possible to allow the phenols and the aldehydes described above to have a reaction under slightly acidic conditions, for example, with a pH of 4 to 6 by using a zinc-based catalyst.

As the zinc-based catalyst, any of divalent metal salt catalysts can be used without particular limitation. For example, zinc acetate, zinc formate, and the like can be used. One kind of each of these compounds may be used singly, or two or more kinds of these compounds may be used in combination. For example, a hydrate of zinc acetate may be used.

The amount of the aforementioned alkaline catalyst or zinc-based catalyst added with respect to 100% by weight of the phenols may be, for example, 0.01% by weight to 20% by weight, and preferably can be 0.1% by weight to 10% by weight.

In the present specification, unless otherwise specified, "to" means that a range includes an upper limit and a lower limit.

The molar ratio (F/P molar ratio) of phenols:aldehydes may be, for example, 1 mol:0.5 mol to 1 mol:4.0 mol, and preferably can be 1 mol:1.0 mol to 1 mol:3.0 mol. In a case where the aldehydes are within the above range, a conversion rate of the aldehydes with respect to 1 mol of the phenols is increased, and accordingly, residual unreacted aldehydes can be reduced.

The reaction temperature may be, for example, 40° C. to 120° C., and preferably 60° C. to 100° C. In a case where the reaction temperature is within the above range, it is possible to allow the reaction to sufficiently proceed by inhibiting gelation. The reaction time is not particularly limited, and may be appropriately determined according to the type of starting materials, the molar ratio for mixing, the amount and type of catalysts used, and the reaction conditions.

In the present embodiment, water or an organic solvent may be used as a solvent. The examples of the organic solvent include alcohols, ketones, esters, ethers, hydrocarbons. Examples of the alcohols include methanol, ethanol, propanol, isopropanol, butanol, pentanol, hexanol, octanol, ethylene glycol, diethylene glycol, triethylene glycol, propylene glycol, glycerin, and the like. Examples of the ketones include acetone, methyl ethyl ketone, methyl isobutyl ketone, diisobutyl ketone, cyclohexanone, and the like. Examples of the esters include methyl acetate, ethyl acetate, propyl acetate, butyl acetate, methoxybutyl acetate, amyl acetate, methyl lactate, ethyl lactate, butyl lactate, and the like. Examples of the ethers include propyl ether, dioxane, methyl cellosolve, ethyl cellosolve, propyl cellosolve, butyl cellosolve, propylene glycol monomethyl ether, propylene glycol monoethyl ether, propylene glycol monopropyl ether, propylene glycol monobutyl ether, methyl carbitol, ethyl carbitol, butyl carbitol, methyl cellosolve acetate, ethyl cellosolve acetate, propyl cellosolve acetate, butyl cellosolve acetate, propylene glycol monomethyl ether acetate, propylene glycol monoethyl ether acetate, propylene glycol monopropyl ether acetate, and propylene glycol monobutyl ether acetate. Examples of the hydrocarbons include toluene, xylene, pentane, hexane, cyclohexane, heptane, octane, decane, solvent naphtha, industrial gasoline, petroleum ether, petroleum benzine, ligroin, and the like. One kind of each of these compounds may be used singly, or two or more kinds of these compounds may be used in combination.

A dehydration step may be additionally performed. As a dehydration method, dehydration under reduced pressure or dehydration under normal pressure may be used. For example, at the time of dehydration under reduced pressure, a degree of vacuum may be equal to or lower than 110 torr, and more preferably equal to or lower than 80 torr. In a case where the degree of vacuum is as described above, it is possible to reduce the time of dehydration and to obtain stable resol-type phenol resins that less exhibit variation in resin characteristics. By these methods, moisture can be thoroughly removed. However, in order to further remove moisture, the dehydration step may be combined with a step using a known moisture removing device such as a vacuum drier or a thin film evaporator.

Through the above steps, it is possible to obtain the resol-type phenol resin having, in the molecular structure thereof, the structural unit A derived from a phenol compound having one phenolic hydroxyl group represented by the following General Formula (A) and the structural unit B derived from polyfunctional phenol compound having two phenolic hydroxyl groups represented by the following General Formula (B).

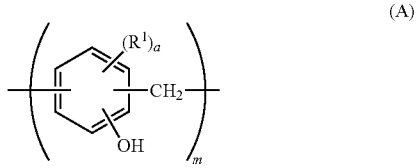

(A)

In General Formula (A), $R^1$ each independently represents a substituent other than a hydroxyl group, a represents an integer of 0 to 3, and m represents an integer equal to or greater than 1 and equal to or smaller than 10.

As the substituent in the General Formula (A), for example, an alkyl group, an aryl group, a vinyl group, a halogen element, an amino group, and a nitro group can be each independently used, or a group obtained by combining these can be used. Among these, an unreactive substituent is preferable, and a hydrocarbon group such as an alkyl group or an aryl group is more preferable. Examples of the alkyl group include a linear or branched alkyl group having 1 to 10 carbon atoms.

a represents 0 to 3. a is preferably 0 to 2, and more preferably 0 or 1.

As $R^1$ in the General Formula (A), among these, a hydrogen atom, a methyl group, an ethyl group, a propyl group, or a butyl group is preferable, and a hydrogen atom or a methyl group is more preferable.

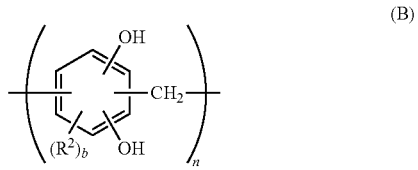

(B)

In the General Formula (B), $R^2$ each independently represents a substituent other than a hydroxyl group, b represents an integer of 0 to 2, and n represents an integer equal to or greater than 1 and equal to or smaller than 10.

As the substituent in the General Formula (B), for example, an alkyl group, an aryl group, a vinyl group, a halogen element, an amino group, and a nitro group can be each independently used, or a group obtained by combining these can be used. Among these, an unreactive substituent is preferable, and a hydrocarbon group such as an alkyl group or an aryl group is more preferable. Examples of the alkyl group include a linear or branched alkyl group having 1 to 10 carbon atoms.

b represents 0 to 3. b is preferably 0 to 2, and more preferably 0 or 1.

As $R^2$ in the General Formula (B), among these, a hydrogen atom, a methyl group, an ethyl group, a propyl group, or a butyl group is preferable, and a hydrogen atom or a methyl group is more preferable.

The resol-type phenol resin obtained as above is used in the phenol resin for a wet friction material described above.

The phenol resin for a wet friction material may be constituted only with the resol-type phenol resin. Alternatively, the phenol resin for a wet friction material may be constituted such that the phenol resin contains the resol-type phenol resin and raw material monomers constituting the structural unit A or the structural unit B in the resol-type phenol resin. The phenol resin for a wet friction material may contain, in addition to the resol-type phenol resin, raw material monomers which constitute the resol-type phenol resin at a proportion of, for example, several percents to dozens of percent in terms of mass. The raw material monomers in the phenol resin for a wet friction material are incorporated into a cured skeleton derived from the resol-type phenol resin at the time of curing in the process of manufacturing a wet friction material that will be described later. In a case where the phenol resin for a wet friction material contains the raw material monomers, the improvement of strength of the wet friction material is expected.

Next, the characteristics of the phenol resin for a wet friction material of present embodiment will be described.

The resol-type phenol resin may stay in liquid form at room temperature of 25° C., and can be used as a liquid phenol resin. In a case where the resol-type phenol resin is used as a liquid phenol resin, the impregnating properties with respect to a substrate can be improved.

The lower limit of the proportion of the structural unit B contained in the resol-type phenol resin with respect to a total of 100% by weight of the structural unit A and the structural unit B is, for example, equal to or higher than 10% by weight, preferably equal to or higher than 15% by weight, and more preferably equal to or higher than 20% by weight. In a case where the lower limit is within the above range, the durability of the wet friction material can be improved. In contrast, the upper limit of the proportion of the structural unit B contained in the resol-type phenol resin with respect to a total of 100% by weight of the structural unit A and the structural unit B may be, for example, equal to or lower than 90% by weight, preferably equal to or lower than 70% by weight, and more preferably equal to or lower than 60% by weight. In a case where the upper limit is within the above range, the durability can be in balance with other physical characteristics.

The proportion of the structural unit B contained in the resol-type phenol resin can be measured, for example, by NMR.

At room temperature of 25° C., the viscosity of the phenol resin for a wet friction material may be, for example, equal to or higher than 1 mPa·s and equal to or lower than 500 mPa·s, preferably equal to or higher than 3 mPa·s and equal to or lower than 300 mPa·s, and more preferably equal to or higher than 5 mPa·s and equal to or lower than 200 mPa·s. In a case where the viscosity is within the above range, the impregnating properties with respect to a substrate can be in balance with fixing properties.

The weight-average molecular weight Mw of the phenol resin for a wet friction material may be, for example, equal to or greater than 100 and equal to or smaller than 10,000, preferably equal to or greater than 120 and equal to or smaller than 5,000, and more preferably equal to or greater than 150 and equal to or smaller than 3,000. In a case where Mw of the phenol resin for a wet friction material is within the above range, the impregnating properties with respect to a substrate can be in balance with the curing properties.

In the present embodiment, the weight-average molecular weight Mw can be determined, for example, by gel permeation chromatography (GPC). For GPC, a calibration curve created using a polystyrene standard substance can be used. GPC can be performed using tetrahydrofuran as an elution solvent under the conditions of a flow rate of 1.0 ml/min and a column temperature of 40° C. For GPC, a device can be used which is constituted with HLC-8020 manufactured by Tosoh Corporation as a main body and columns for analysis consisting of one TSKgel G1000HXL column, two TSKgel G2000HXL columns, and one TSKgel G3000HXL column manufactured by Tosoh Corporation.

Next, the resin composition for a wet friction material of the present embodiment will be described.

The resin composition for a wet friction material (phenol resin composition) of the present embodiment can contain the phenol resin for a wet friction material described above and an organic solvent.

The resin composition for a wet friction material is for forming a wet friction material, and different from adhesives used for bonding a friction material to a metal substrate.

The organic solvent is not particularly limited. For example, it is possible to use an alcohol-based organic solvent such as methanol, ethanol, isopropanol, or butanol, a ketone-based organic solvent such as acetone, methyl ethyl ketone, or methyl isobutyl ketone, an aromatic hydrocarbon solvent such as toluene or ethyl benzene, or a mixture of these. From the viewpoint of realizing an efficient manufacturing process at low costs, from the viewpoint of improving the impregnating properties of the resin composition with respect to a substrate, and the like, it is particularly preferable that the resin composition contains methanol or acetone among the above compounds.

The resin composition for a wet friction material may contain other components in addition to the components described above.

Those other components are not particularly limited, and examples thereof include a phenol resin other than the resol-type phenol resin, water, a curing agent such as hexamine, an elastomer, various additives, and the like. Those other components can be constituted such that the components do not contain polyvinyl butyral as an adhesive component.

The proportion of nonvolatile components (solid contents) in the resin composition for a wet friction material with respect to the total amount of the resin composition for a wet friction material may be equal to or higher than 10% and equal to or lower than 90%, preferably equal to or higher than 20% and equal to or lower than 80%, and more preferably equal to or higher than 30% and equal to or lower than 70%. In a case where the proportion of nonvolatile components is within the above range, the impregnating properties with respect to a substrate can be in balance with the amount of resin attached.

The resin composition for a wet friction material can be particularly suitably used for impregnation. The substrate to be impregnated with the resin composition is not particularly limited. As the substrate, it is possible to use fibers such as natural fiber, metal fiber, carbon fiber, and chemical fiber. Specifically, it is possible to use fibers including natural fiber such as natural pulp fiber and linter pulp, inorganic fiber such as glass fiber, carbon fiber such as polyacrylonitrile (PAN)-based carbon fiber and pitch-based carbon fiber, and chemical fiber such as aramid fiber and phenol fiber. One kind of each of these fibers may be used singly, or two or more kinds of these fibers may be used in combination. Among these, from the viewpoint of friction characteristics and durability, aramid fiber is preferably used as a main component of a fiber substrate. The form of the fiber is not particularly limited, and non-woven cloth, woven cloth, and the like can be used. In this case, for example, by impregnating a substrate, which is constituted with a fiber material, with the resin composition for a wet friction material and then firing and curing the resin composition, a wet friction material can be formed.

(Wet Friction Material)

The wet friction material of the present embodiment is obtained by impregnating a substrate with the resin composition for a wet friction material (phenol resin composition) described above.

In a case where the resin composition for a wet friction material is used for a wet paper friction material, by impregnating a paper substrate, which is filled with metal fiber or carbon fiber, chemical fiber, a friction adjuster such as cashew dust, diatomite, and the like, with the resin composition for a wet friction material of the invention and then firing and curing the resin composition, a wet friction material can be obtained.

In the wet friction material described above, the lower limit of the proportion of the structural unit B contained in the cured substance of the phenol resin composition with respect to a total of 100% by weight of the structural unit A and the structural unit B is, for example, equal to or greater than 10% by weight, preferably equal to or greater than 15% by weight, and more preferably equal to or greater than 20% by weight. In a case where the lower limit is within the above range, the durability of the wet friction material can be improved. In contrast, the upper limit of the proportion of the structural unit B contained in the cured substance of the phenol resin composition with respect to a total of 100% by weight of the structural unit A and the structural unit B may be, for example, equal to or smaller than 90% by weight, preferably equal to or smaller than 70% by weight, and more preferably equal to or smaller than 60% by weight. In a case where the upper limit is within the above range, the durability can be in balance with other physical characteristics.

The wet friction material obtained as above can realize excellent durability.

Hitherto, the embodiments of the invention have been described. However, the embodiments are merely examples of the invention, and the invention can adopt various other constitutions It is apparent that the present invention is not limited to the above embodiment, and may be modified and changed without departing from the scope and spirit of the invention.

EXAMPLES

Hereinafter, the invention will be specifically described with reference to examples, but the invention is not limited to the examples.

<Preparation of Resol-Type Phenol Resin>

Example 1

First, 100 parts by weight of phenol, 200 parts by weight of a 37% aqueous formalin solution, and 2 parts by weight of a 50% aqueous sodium hydroxide solution were added to a reaction apparatus including a stirring device, a reflux condenser, and a thermometer, and allowed to react for 30 minutes under reflux conditions. Then, while the reaction solution was being dehydrated under the condition of pressure reduced to 91 kPa, and at a point in time when the internal temperature of the system became 70° C., 200 parts by weight of methanol and 100 parts by weight of resorcinol (molar ratio of aldehydes/phenols=1.25) were added thereto and allowed to react for 30 minutes at 60° C. Thereafter, 15 parts by weight of methanol was added thereto, thereby obtaining a resol-type phenol resin 1 having a weight-average molecular weight of 1,100.

It was confirmed that the obtained resol-type phenol resin 1 has, in one molecule, the structural unit A derived from phenol and the structural unit B derived from resorcinol.

Example 2

A resol-type phenol resin 2 having a weight-average molecular weight of 700 was obtained in the same manner as in Example 1, except that the amount of phenol mixed was changed to 160 parts by weight and the amount of resorcinol mixed was changed to 40 parts by weight (molar ratio of aldehydes/phenols=1.19).

It was confirmed that the obtained resol-type phenol resin 2 has, in one molecule, the structural unit A derived from phenol and the structural unit B derived from resorcinol.

Example 3

First, 100 parts by weight of phenol, 100 parts by weight of hydroquinone, 200 parts by weight of a 37% aqueous formalin solution (molar ratio of aldehydes/phenols=1.25), and 2 parts by weight of a 50% aqueous sodium hydroxide solution were added to the same reactor as that in Example 1, and allowed to react for 30 minutes under reflux conditions. Then, while the reaction solution was being dehydrated under the condition of pressure reduced to 91 kPa, at a point time when the internal temperature of the system became 70° C., 200 parts by weight of methanol was added thereto, thereby obtaining a resol-type phenol resin 3 having a weight-average molecular weight of 850.

It was confirmed that the obtained resol-type phenol resin 3 has, in one molecule, the structural unit A derived from phenol and the structural unit B derived from hydroquinone.

Comparative Example 1

A resol-type phenol resin 4 having a weight-average molecular weight of 950 was obtained in the same manner as in Example 3, except that the amount of phenol mixed was changed to 200 parts by weight, and resorcinol was not used.

It was confirmed that the obtained resol-type phenol resin 4 has the structural unit A derived from phenol in one molecule but does not have the structural unit B derived from a polyfunctional phenol compound having two phenolic hydroxyl groups.

TABLE 1

|  |  | Unit | Example 1 | Example 2 | Example 3 | Comparative Example 1 |
|---|---|---|---|---|---|---|
| Resol-type phenol resin | Structural unit A |  | Include Derived from phenol | Include Derived from phenol | Include Derived from phenol | Include Derived from phenol |
|  | Structural unit B |  | Include Derived from resorcinol | Include Derived from resorcinol | Include Derived from hydroquinone | Not include — |
|  | Proportion of structural unit B contained | % by weight | 50 | 20 | 50 | 0 |
|  | Weight-average molecular weight |  | 1,100 | 700 | 850 | 950 |

Each of the obtained resol-type phenol resins 1 to 4 was used as a phenol resin for a wet friction material and evaluated in terms of the following evaluation items.

(Weight-Average Molecular Weight)

Each of the obtained resol-type phenol resins was dissolved in tetrahydrofuran and subjected to GPC. For GPC, a calibration curve created using a polystyrene standard substance was used. GPC was performed using tetrahydrofuran as an elution solvent under the conditions of a flow rate of 1.0 ml/min and a column temperature of 40° C. For GPC, a device was used which is constituted with HLC-8020 manufactured by Tosoh Corporation as a main body and columns for analysis consisting of one TSKgel G1000HXL column, two TSKgel G2000HXL columns, and one TSKgel G3000HXL column manufactured by Tosoh Corporation.

<Preparation of Test Piece of Wet Friction Material>

By adding methanol to each of the resol-type phenol resins 1 to 4 (phenol resin for a wet friction material) obtained in the examples and the comparative examples described above, phenol resin compositions 1 to 4 were prepared in which the concentration of each of the resol-type phenol resins is 30% by weight.

Thereafter, a paper substrate, which was prepared from a mixture of natural pulp fiber, aramid fiber, diatomite and the like, was impregnated with each of the phenol resin compositions 1 to 4 and cured, thereby obtaining materials which are wet friction materials. By bonding each of these wet friction materials to a carbon steel plate, wet friction plates used for evaluation were prepared.

In the obtained wet friction materials, the proportion of the structural unit B contained in the cured substance of the phenol resin composition 1 was 50% by weight with respect to a total of 100% by weight of the structural unit A and the structural unit B, the proportion of the structural unit B contained in the cured substance of the phenol resin composition 2 was 20% by weight with respect to a total of 100% by weight of the structural unit A and the structural unit B, the proportion of the structural unit B contained in the cured substance of the phenol resin composition 3 was 50% by weight with respect to a total of 100% by weight of the structural unit A and the structural unit B, and the proportion of the structural unit B contained in the cured substance of the phenol resin composition 4 was 0% by weight with respect to a total of 100% by weight of the structural unit A and the structural unit B. Because it was confirmed that substantially all of the raw material monomers reacted, the proportion of the structural unit B contained in the cured substance was calculated by [amount of resorcinol or hydroquinone (part by weight)/amount of resorcinol or hydroquinone (part by weight)+amount of phenol (part by weight)]×100. The unit is % by weight.

(Repeated Compression Fatigue Test)

By using the obtained wet friction plates, a repeated compression fatigue test was performed. Specifically, by using a repeated compression fatigue testing machine, a compression fatigue test was performed under the testing conditions shown in Table 2.

To set up evaluation standards, the change in the total thickness caused by the compression fatigue test repeated 100,000 cycles was calculated as a distortion rate (%). The evaluation standards are as below. The results are shown in Table 3.

Evaluation Standards:

A: The distortion rate is equal to or lower than 20%, and the durability is better than the evaluation standards.

B: The distortion rate is higher than 20% and equal to or lower than 30%, and the durability meets the evaluation standards.

C: The distortion rate is higher than 30%, and the durability does not meet the evaluation standards.

TABLE 2

| Item | Conditions |
|---|---|
| Diameter of friction plate (mm) | Φ127 |
| Surface pressure (MPa) | 10 |
| Lubrication | Oil bath |
| Oil temperature (° C.) | 120 |
| Cycle (sec) | 3 sec/27 sec (compression/release) |

TABLE 3

| | | Example 1 | Example 2 | Example 3 | Comparative Example 1 |
|---|---|---|---|---|---|
| Durability | Repeated compression fatigue test | A | B | B | c |

It was confirmed that in a case where each of the resol-type phenol resins of Examples 1 to 3 is used as a phenol resin for a wet friction material, the distortion rate becomes lower than the distortion rate in Comparative Example 1, and the phenol resins of Examples 1 to 3 fully meet the evaluation standards. Furthermore, it was found that the phenol resins of Examples 1 to 3 improve the durability of a wet friction material.

Accordingly, the resol-type phenol resins of Examples 1 to 3 can be suitably used in a wet friction material (clutch friction material) because the phenol resins improve the durability of a wet friction material.

What is claimed is:

1. A phenol resin for a wet friction material, comprising: a resol-type phenol resin having, in one molecule, a structural unit A which is derived from a phenol compound having one phenolic hydroxyl group represented by the following General Formula (A) and a structural unit B which is derived from a polyfunctional phenol compound having two phenolic hydroxyl groups represented by the following General Formula (B),

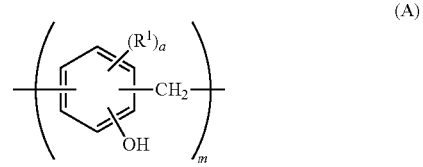

(in General Formula (A), $R^1$ each independently represents a substituent other than a hydroxyl group, the substituent each independently being selected from the group consisting of a hydrogen atom, an alkyl group, an aryl group, a vinyl group, a halogen element, an amino group, and a nitro group, a represents an integer of 0 to 3, and m represents an integer equal to or greater than 1 and equal to or smaller than 10),

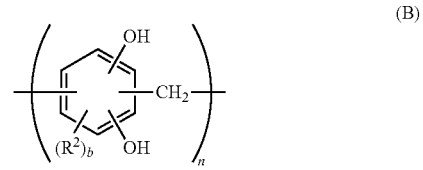

(in General Formula (B), $R^2$ each independently represents a substituent other than a hydroxyl group, the substituent each independently being selected from the group consisting of a hydrogen atom, an alkyl group, an aryl group, a vinyl group, a halogen element, an amino group, and a nitro group, b represents an integer of 0 to 2, and n represents an integer equal to or greater than 1 and equal to or smaller than 10), wherein a proportion of the structural unit B contained in a cured substance of the phenol resin composition is equal to or higher than 10% by weight and equal to or lower than 90% by weight with respect to a total of 100% by weight of the structural unit A and the structural unit B.

2. The phenol resin for a wet friction material according to claim 1, wherein the polyfunctional phenol compound having two phenolic hydroxyl groups contains one or more kinds of compounds selected from the group consisting of resorcinol, catechol, and hydroquinone.

3. The phenol resin for a wet friction material according to claim 1, wherein a weight-average molecular weight Mw of the phenol resin for a wet friction material is equal to or greater than 100 and equal to or smaller than 10,000.

4. A phenol resin composition comprising:
the phenol resin for a wet friction material according to claim 1; and
an organic solvent.

5. A wet friction material obtained by impregnating a substrate with the phenol resin composition according to claim 4.

6. The wet friction material according to claim 5,
wherein a proportion of the structural unit B contained in a cured substance of the phenol resin composition is equal to or higher than 10% by weight and equal to or lower than 90% by weight with respect to a total of 100% by weight of the structural unit A and the structural unit B.

7. The phenol resin for a wet friction material according to claim 1, wherein the resol-type phenol resin stays in liquid form at room temperature of 25° C.

8. The phenol resin for a wet friction material according to claim 1, wherein the viscosity of the resol-type phenol resin is equal to or higher than 1 mPa·s and equal to or lower than 500 mPa·s at room temperature of 25° C.

\* \* \* \* \*